UNITED STATES PATENT OFFICE.

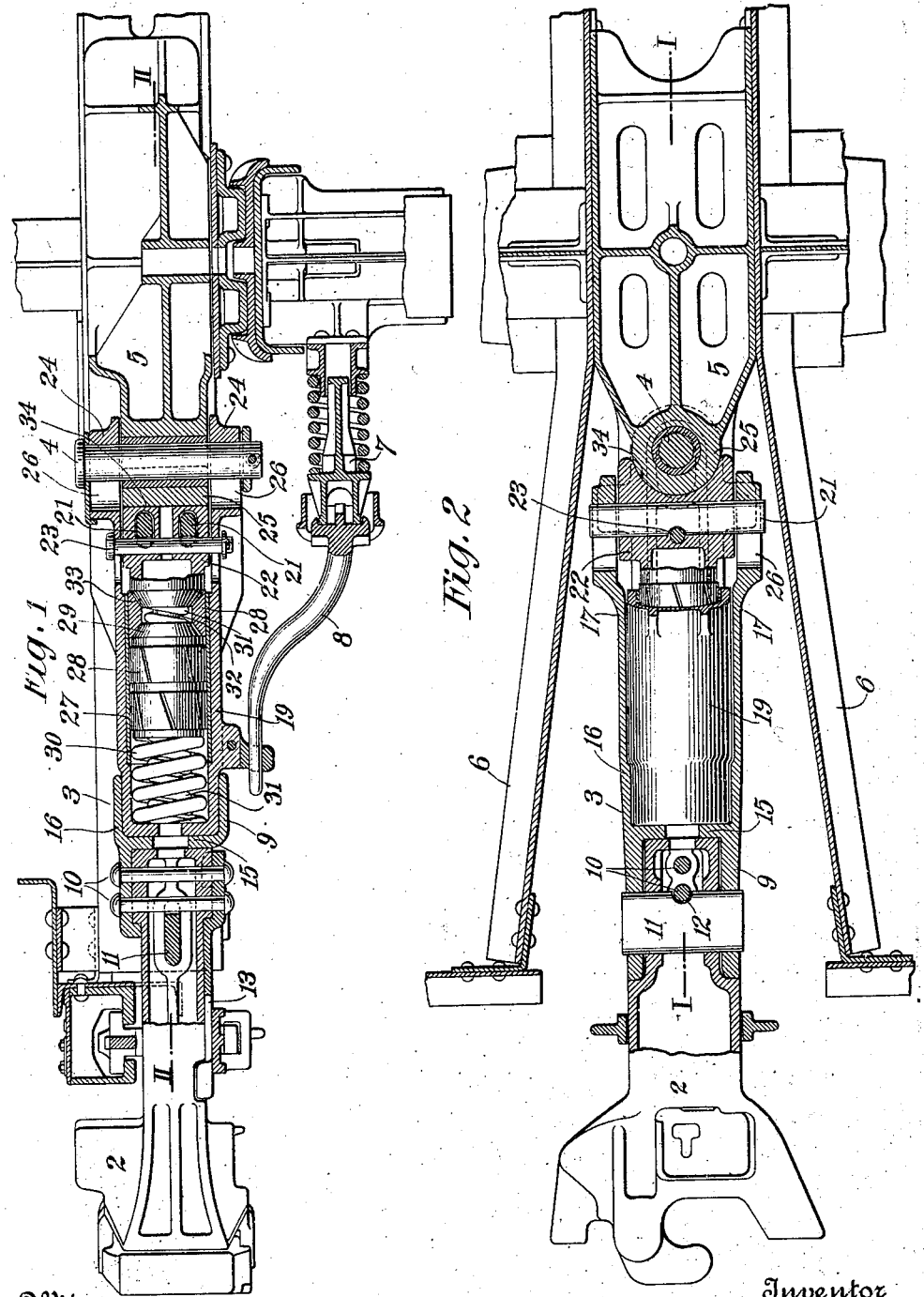

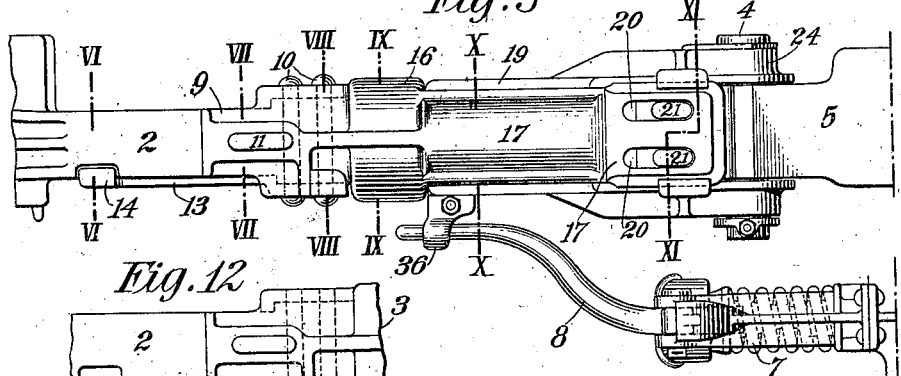
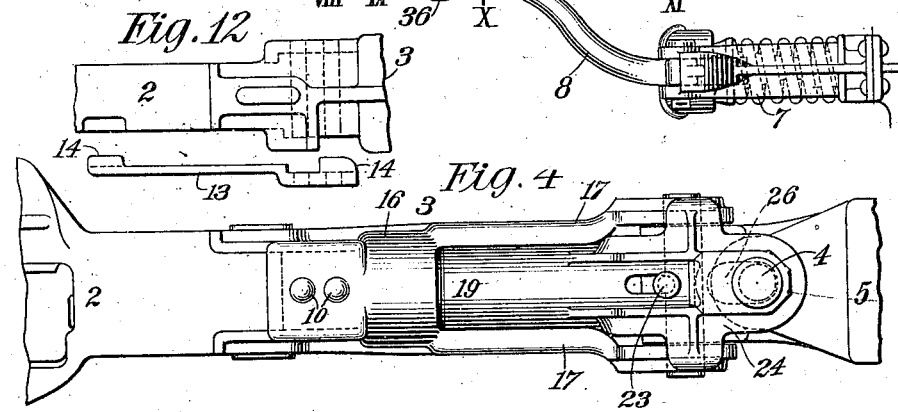
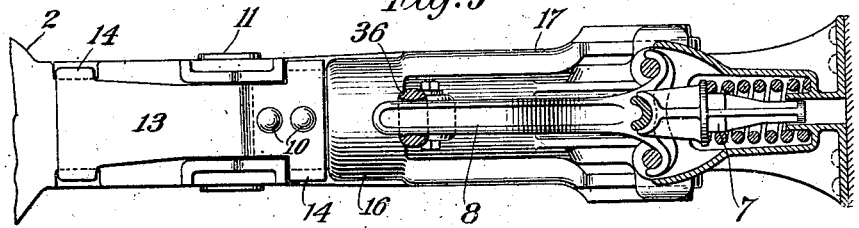
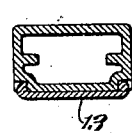
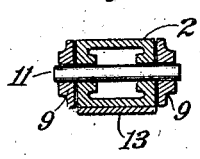
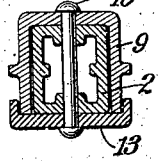
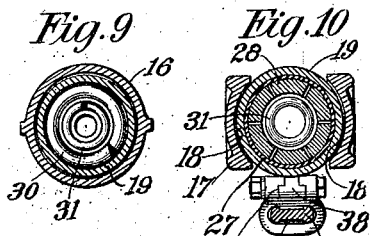
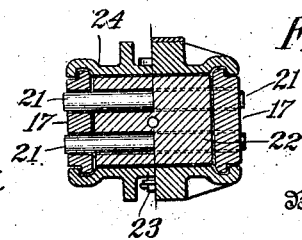

HARRY T. KRAKAU, OF CLEVELAND, OHIO, ASSIGNOR TO THE NATIONAL MALLEABLE CASTINGS COMPANY.

RADIAL-DRAFT GEAR.

1,178,931.   Specification of Letters Patent.   Patented Apr. 11, 1916.

Application filed August 8, 1912. Serial No. 713,970.

*To all whom it may concern:*

Be it known that I, HARRY T. KRAKAU, a citizen of the United States, residing at Cleveland, Cuyahoga county, Ohio, have invented certain new and useful Improvements in Radial-Draft Gear, of which the following is a specification, reference being had to the accompanying drawings in which—

Figure 1 is a longitudinal section of my device partly in elevation as applied to the underframing of a car on lines I—I of Fig. 2; Fig. 2 is a horizontal section, partly in plan, on line II—II of Fig. 1; Fig. 3 is a side elevation; Fig. 4 is a top plan view; Fig. 5 is a bottom view showing the guiding connection partly in section; Fig. 6 is a section on lines VI—VI of Fig. 3; Fig. 7 is a section on lines VII—VII of Fig. 3; Fig. 8 is a section on lines VIII—VIII of Fig. 3; Fig. 9 is a section on lines IX—IX of Fig 3; Fig. 10 is a section on lines X—X of Fig. 3; Fig. 11 is a section on lines XI—XI of Fig. 3; and Fig. 12 shows details of the attachment of the coupler shank.

My invention relates to radial draft gear, and is primarily designed to provide a member extending rearwardly from the coupler adapted to carry a friction draft rigging.

My invention also provides for other improvements which are adapted to strengthen and better the draft gear and which are more specifically described and claimed herein.

Referring to the drawings, 2 designates the coupler which is attached to the extension member 3, comprised of a number of parts later to be described, and the extension member 3 is pivotally attached by the pivot pin 4 to the pivot casting 5. The pivot casting 5 is riveted between the center sills 6 of the car and forms the pivotal support about which the draft gear, comprised of the coupler 2, and the extension member 3, swings during its radial movement in being guided to the center of the track. Beneath the draft gear and mounted on the truck bolster is a guiding connection 7 which has a forwardly extending and centrally located arm 8 which coöperates with the extension member 3 in a manner later to be described.

The extension member 3 is comprised of an outside casing or main casting 9 which is adapted to receive within its forward end and inclose on its top and sides the shank of the coupler 2. The shank of the coupler and the forward end of the casting are rigidly attached by means of the vertically extending rivets 10 and by the laterally and horizontally extending key 11, which pass through registering slots in the rear end of the shank of the coupler and in the forward end of the casting 9. The key 11 has a recess 12 on its rear side for the reception of the forward rivet 10 by which it is held in place.

As a further strengthening means for the connection between the shank of the coupler 2 and the extension member 3, I provide a reinforcing or clamping plate 13 for the underside of the connection, which has upwardly extending jaws 14 at both its forward and rear ends which engage in recesses in the coupler shank and in the forward end of the casting 9 respectively, and prevents lateral buckling of the coupler 2 and the extension member 3. The clamp 13 is held in place by the rivets 10.

The extension member 3 to the rear of its connection with the coupler shank has inwardly extending shoulders 15 adapted to take up the force of the buffing shock from the coupler shank. To the rear of these shoulders is a cylindrical portion 16, and from this cylindrical portion 16 extend rearwardly the vertically disposed arms 17 which have concave inner surfaces 18. The cylindrical portion 16 of the casting 9 and the arms 17 are adapted for the reception therein of the friction draft rigging barrel or inner casing 19, and supply the place of the usual yoke. Extending transversely through the arms 17 at their rear ends are elongated slots 20 for the reception of the keys 21, by which the arms 17 are attached to the following member 22. The keys 21 are held in place by the pin 23, and by means of these keys 21 and the pin 23 the draft strains are transmitted from the coupler through the extension member 3 to the follower 22 and by it to the frictional parts within the casing 19.

The friction barrel or casing 19 has rearwardly extending arms 24 which are spaced apart sufficiently to inclose and slide over the forwardly projecting portion 25 of the pivot casting 5. These arms 24 have elongated apertures 26 through which the pivot pin 4 passes, the apertures being elongated to permit the friction barrel 19 to have sufficient rearward movement under buffing without throwing any bending stresses on the pivot pin. The arms 24 of the casing 19 also form an interlocking engagement with the arms of the casing 9 and thus prevent the spreading of the latter after the parts have been assembled without the necessity of separate parts such as bolts, rivets, etc., to accomplish this.

The type of draft rigging which I prefer to use with my draft gear is shown in the application of Ernest H. Schmidt, Serial No. 683,035, filed March 11, 1912, and as adapted to the present invention is briefly to be described as follows:

The casing 19 has a hardened bearing surface 27 and bearing against this surface are a plurality of sets of frictional segments 28, against the inclined inner surfaces of which bear the correspondingly inclined surfaces of the cone rings 29. The foremost cone ring 29 bears against the compression spring 30 which at its forward end bears against the forward end of the casing 19. Within the spring 30 is the releasing spring 31 which abuts against the sleeve 32. The rear end of the sleeve 32 bears against the forward end of the follower 22, and the sleeve and the releasing spring 31 act to restore the parts to normal position after buffing or draft. The follower 22 has its forward end 33 in the shape of a cone ring which coacts with the rearmost set of segments 28. In either buffing or draft the entrance of the follower 22 into the casing is resisted by the cone rings 29, the segments 28 and the compression spring 30, and the segments are moved longitudinally of the casing and are pressed outwardly against the frictional surface of the casing with a progressively increasing frictional engagement as the follower enters farther and farther into the casing.

The follower 22, which carries the keys 21, has a concavely curved rear bearing surface 34 which forms a socket for the correspondingly curved forwardly extending portion 25 of the pivot casting 5, to permit the draft gear to have a radial movement about the pivot pin 4.

The arm 8 which connects the extension member 3 with the truck, and guides the coupler to the center of the track, has a sliding bearing in the elongated slot 35 of the small casting 36. This casting 36 has a T slot 37 which fits over a T head 38 bolted to the underside of the inside casing 19. It will be seen that this construction permits a free sliding action between the arm 8 and the slot 35 which is essential on account of the movement of the inside casing 19 during buffing as well as on account of the radial action of the draft gear.

The operation of my device is as follows: When the coupler receives a buffing blow, it is driven rearwardly and carries with it the casting 9, and rearward movement of the casting 9 relative to the key 21 and the follower 22, in which they are positioned, is permitted by the elongated slots 20 of the arms 17. The casting 9 in moving rearwardly carries with it the inside casing 19, the forward end of which abuts against the shoulders 15 of the casting, this rearward movement relative to the pivot pin 4 and the follower 22 being permitted by the elongated slots 26 of the arms 24. The follower 22 is held immovable against its socket bearing 25 on the pivot casting 5, and sets in operation the frictional elements within the inside casing 19. When the buffing blow ceases the parts of the draft gear are restored to their normal position by the operation of the draft rigging. Where the coupler is under draft, it moves forward pulling with it the outside casting 9; the inside casing 19 being held from following the forward movement of the casting by the pivot pin 4 which normally bears against the rear sides of the slots 26 of the casing arms 24. The follower 22 is pulled forwardly with the outside casting 9 by means of the keys 21 into the stationary inside casing 19 and compresses the friction elements therein in the same manner as under buffing.

Many changes may be made in the construction and operation of my improved draft gear without departing from my invention.

What I claim is:

1. In a radial draft gear, a coupler, an extension member having a pivotal connection with the car, the coupler and extension member being rigidly fastened to each other, recesses in the coupler shank and the extension member, and a stiffening plate extending forwardly from the extension member along the under side of the shank to a point forward of the carry iron, the said plate having lugs coöperating with recesses and adapted to be secured to said coupler and said extension member.

2. In a radial draft gear, a pair of interfitting casings, each casing having two rearwardly-extending arms, the said arms comprising an operative connection between the casings, each set of arms having an interlocking engagement with the other set of arms to prevent spreading.

3. In radial draft gear, an outer casing, an inner casing, frictional parts, a follower therefor and a pivot pin, said outer casing being secured at its forward end to the coupler and having a socket portion intermediate its ends, arms extending rearwardly from the socket portion, elongated slots in said arms, a key seated in the slots connecting the arms with the follower, the inner casing containing the frictional parts and being itself contained within the socket portion of the outer casing, and having arms extending rearwardly from the inner casing, and elongated slots in the said arms of the inner casing, engaging the pivot pin, whereby stresses of draft transmitted from the coupler will cause the said casings to telescope and actuate the frictional parts.

4. In radial draft gear, a coupler, an outer casing engaging the coupler, an inner casing, and a pivot pin securing the mechanism to the framing of the car, the outer casing having rearwardly-extending arms with elongated slots adapted to engage a key member and to transmit pulling stresses therethrough to the follower of the draft rigging, the inner casing also having rearwardly-extended arms with elongated slots engaging the pivot pin, the arms of said outer casing being arranged in a horizontal plane and the arms of the inner casing being arranged in a vertical plane.

5. In radial draft gear, a coupler, a forward casing engaging the coupler, a rear casing, and a pivot pin securing the mechanism to the framing of the car, the forward casing having rearwardly-extending arms with elongated slots adapted to engage a key member and to transmit pulling stresses therethrough to the follower of the draft rigging, the rear casing also having rearwardly-extended arms, the arms of said forward casing being laterally disposed and the arms of the rear casing being disposed one above the other.

6. In a radial draft gear, a coupler, and a draft member pivotally mounted upon a car, said draft member comprising a pair of interfitting casings, each casing having a plurality of arms, the said arms forming an operative connection between the casings and the coupler and the pivotal point on the car, one set of said arms having a longitudinally-slidable interlocking engagement with the other set to prevent spreading.

7. In a radial draft gear, a pair of interfitting casings, each casing having a pair of arms, one pair of arms being vertically disposed one above another and the other pair of arms being laterally disposed, said pairs of arms having a longitudinally-slidable interlock with each other whereby the laterally-disposed arms are prevented from spreading.

HARRY T. KRAKAU.

Witnesses:
 HARRY E. ORR,
 R. L. LEHMAN.